(12) United States Patent  
Terakawa et al.

(10) Patent No.: US 7,490,891 B2  
(45) Date of Patent: Feb. 17, 2009

(54) SPOILER DEVICE

(75) Inventors: Kazuki Terakawa, Anjo (JP); Makoto Sakai, Toyota (JP)

(73) Assignee: Aisin Seiki Kabushiki Kaisha, Kariya-shi, Aichi (JP)

( * ) Notice: Subject to any disclaimer, the term of this patent is extended or adjusted under 35 U.S.C. 154(b) by 0 days.

(21) Appl. No.: 12/215,391

(22) Filed: Jun. 27, 2008

(65) Prior Publication Data

US 2009/0001757 A1 Jan. 1, 2009

(51) Int. Cl.  
*B60J 7/00* (2006.01)

(52) U.S. Cl. .................... 296/180.1; 296/146.8

(58) Field of Classification Search .............. 296/180.1, 296/180.2, 146.8  
See application file for complete search history.

(56) References Cited

U.S. PATENT DOCUMENTS 7,029,058 B2 * 4/2006 Mathew .................. 296/180.1

FOREIGN PATENT DOCUMENTS

| JP | 10-167126 | 6/1998 |
|----|-----------|--------|
| JP | 3526021   | 4/2004 |

* cited by examiner

*Primary Examiner*—Joseph D Pape  
(74) *Attorney, Agent, or Firm*—Finnegan, Henderson, Farabow, Garrett & Dunner, LLP.

(57) ABSTRACT

According to an aspect of the present invention, a spoiler device for a vehicle for controlling air stream of the vehicle, the spoiler device covering a hinge member and pivoting in response to a pivotal movement of a back door supported by the hinge member in a pivotally movable manner in a vertical direction thereof, includes an upper wall portion adapted to be arranged adjacent to a roof of the vehicle and extending along the roof in a width direction of the vehicle, a lower wall portion formed integrally with the upper wall portion by blow forming and provided between the upper wall portion and a hinge shaft provided at the hinge member, the lower wall portion including an opening at a portion located above the hinge shaft, and a cover fixedly attached to the lower wall portion for covering the opening thereby to cover the hinge member.

5 Claims, 2 Drawing Sheets

US 7,490,891 B2

SPOILER DEVICE

CROSS REFERENCE TO RELATED APPLICATIONS

This application is based on and claims priority under 35 U.S.C. § 119 to Japanese Patent Application 2007-171320, filed on Jun. 29, 2007, the entire contents of which are incorporated herein by reference.

FIELD OF THE INVENTION

The present invention relates to a spoiler device adapted to be used for a vehicle such as an automobile.

BACKGROUND

Known spoilers are disclosed in JP10-167126A and in JP3526021B.

A roof spoiler (a spoiler) disclosed in JP10-167126A, which is formed by injection molding, is provided along a rear edge of a roof panel (a roof). The roof spoiler is provided on the roof panel so as to cover hinge members that are mounted to the rear edge of the roof panel and are pivotally supporting a back door. The roof spoiler pivots about hinge shafts of the hinge members relative to the roof panel in response to a pivotal movement of the back door.

An air spoiler (a spoiler) disclosed in JP3526021B is made of thermoplastic resin by blow molding and is mounted to a rear hatch door (a back door) of a vehicle. The rear hatch door is pivotally mounted to a roof end of a roof panel (a roof) of a vehicle by means of hinges. The air spoiler pivots about hinge shafts relative to the roof panel in response to a pivotal movement of the rear hatch door.

According to each of the above-described known spoiler, a gap (a required clearance) is provided between the spoiler and the roof so as to allow the spoiler to pivot relative to the roof. From a viewpoint of appearance of the roof, the smaller required clearance is better. In order to reduce the required clearance, the hinge shafts need to be provided as close as possible to a design surface (an upper wall portion) of the spoiler. In particular, thickness of the spoiler needs to be reduced as much as possible at portions located above the hinge shafts.

The spoiler disclosed in JP10-167126A is injection molded and includes only one surface layer (an upper wall portion) that constitutes the design surface. Therefore, thickness of the spoiler at the portions located above the hinge shafts may be reduced relatively simply, however there arises a concern of heat deformation or decrease in strength of the portions. It is conceivable to constitute the design surface with two layers by injection molding the upper wall portion and the lower wall portion separately, and by adhesively joining them together. The constitution, however, requires additional cost and involves concerns of deterioration of appearance, strength and a waterproof performance of the joints.

Since the spoiler disclosed in JP3526021B is a hollow unit made by blow molding, in order to reduce thickness of the spoiler at the portions located above the hinge shafts, the upper wall portion and the lower wall portion need to be formed as close to each other as possible. When the upper wall portion and the lower wall portion are formed closer, the two walls adhere to each other after a blow molding process, and thus sink marks are more likely to occur on the design surface. The sink marks occurring on the design surface need to be eliminated in order to improve the appearance of the spoiler, which requires additional cost for surface finishing and so forth.

A need thus exists for a spoiler device which is not susceptible to the drawback mentioned above.

SUMMARY OF THE INVENTION

According to an aspect of the present invention, a spoiler device for a vehicle for controlling air stream of the vehicle, the spoiler device covering a hinge member and pivoting in response to a pivotal movement of a back door supported by the hinge member in a pivotally movable manner in a vertical direction thereof, includes an upper wall portion adapted to be arranged adjacent to a roof of the vehicle and extending along the roof in a width direction of the vehicle, a lower wall portion formed integrally with the upper wall portion by blow forming and provided between the upper wall portion and a hinge shaft provided at the hinge member, the lower wall portion including an opening at a portion located above the hinge shaft, and a cover fixedly attached to the lower wall portion for covering the opening.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

An embodiment of the present invention is described in more detail below referring to the accompanying drawings.

Figure 1:
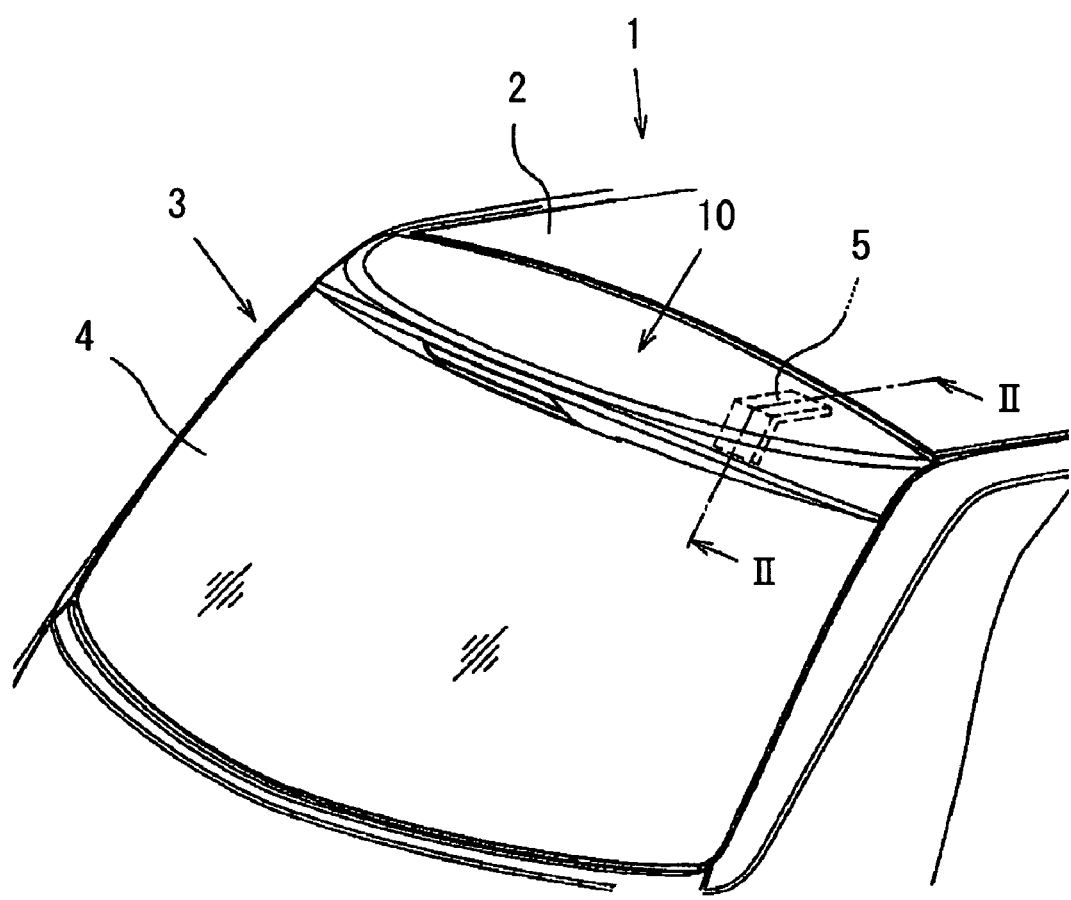
FIG. 1 is a perspective view of an automobile mounted with a spoiler device according to an embodiment of the present invention.

As shown in FIG. 1, a spoiler device 10 is mounted along a rear edge of a roof 2 of an automobile 1 serving as a vehicle. A back door 3 is mounted to a rear section of the automobile 1 and includes a back door main body 6 and a glass 4. The back door 3 is supported to the automobile 1 so as to pivot in a vertical direction of the automobile 1 by a hinge member 5 mounted on the rear edge of the roof 2. In particular, the back door main body 6 and the glass 4, both constituting the back door 3, are supported by the hinge member 5 so that each of the back door main body 6 and the glass 4 individually pivots in the vertical direction of the automobile 1. The spoiler device 10 is provided above the hinge member 5 so as to cover the hinge member 5 and pivots relative to the roof 2 in response to a pivotal movement of the back door 3. According to the embodiment, the back door 3 is supported by, for example, two hinge members 5, 5.

Figure 2:
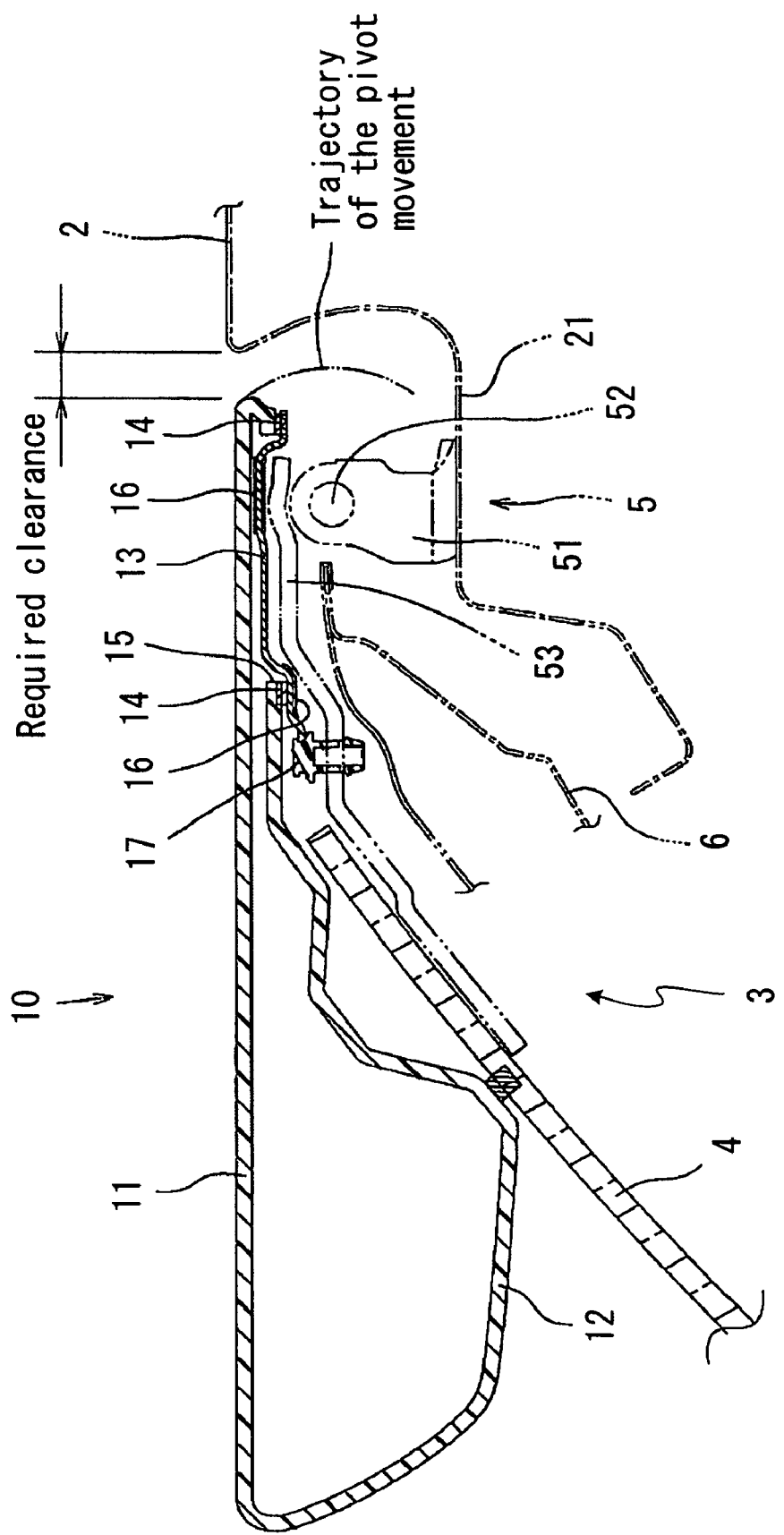
FIG. 2 is a cross-sectional view taken on line II-II of FIG. 1.

As shown in FIG. 2, the spoiler device 10 is provided above the hinge member 5. The hinge member 5 is mounted on the rear edge of the roof 2 and includes a bracket 51, a common hinge shaft 52 and an arm 53. The common hinge shaft 52 is common to both the arm 53 and a below-mentioned non-shown arm. The bracket 51 is fixedly mounted on a body panel 21 located at the rear edge of the roof 2. The common hinge shaft 52 includes a pivot center of the hinge member 5. The arm 53 is fixedly attached to the glass 4 and to the spoiler device 10 by means of fastening members such as bolts. The arm 53 vertically pivots about the common hinge shaft 52 relative to the bracket 51, thereby allowing the glass 4 and the spoiler device 10 to pivot about the common hinge shaft 52 of the hinge member 5. The hinge member 5 is connected also to the back door 3 via a non-shown arm having a similar structure as that of the arm 53. That is, the arm 53 and the non-shown arm pivot about the common hinge shaft 52. Consequently, the back door main body 6 pivots about the common hinge shaft 52 of the hinge member 5 relative to the roof 2 together with the glass 4 and the spoiler device 10.

The spoiler device 10 is formed by blow molding thermoplastic resin, and includes an upper wall portion 11, a lower wall portion 12, a cover 13 and a sealing sponge 14 serving as a seal member.

The upper wall portion 11 is arranged adjacent to the roof 2 of the automobile 1 and extends along the roof 2 in a width direction of the automobile 1 so as to form a flat surface. The upper wall portion 11 serves as a design surface of the spoiler and defines, together with the roof 2, an exterior design of a top surface of the automobile 1. The lower wall portion 12 is formed integrally with the upper wall portion 11 by blow forming, and located between the upper wall portion 11 and the hinge member 5. According to the embodiment, thickness of the spoiler device 10 is set to be extremely small at a portion located above the common hinge shaft 52. The lower wall portion 12 of the spoiler device 10 includes an opening 15 at the portion located above the common hinge shaft 52. The opening 15 is formed on the lower wall portion 12 after the upper wall portion 11 and the lower wall portion 12 are integrally formed by blow forming.

The cover 13 is an iron plate according to the embodiment. However, material of the cover 13 is not limited to iron or other metals, and other materials having high strength are also applicable. A positioning pin 17 is fixedly attached to the cover 13 for positioning the spoiler device 10 relative to the arm 53. The cover 13 is fixedly attached to the spoiler device 10 and to the arm 53 of the hinge member 5 by means of a fixing member (such as a bolt). The cover 13 is provided on the spoiler device 10 so as to cover the opening 15 formed on the lower wall portion 12. The cover 13 is bent towards an inside of the opening 15 and is in a recessed shape in a direction of the upper wall portion 11. In other words, a cross section of the cover 13 in the vertical direction of the automobile 1 is in substantially inverted U-shaped.

The sealing sponge 14 serving as the seal member is provided between the lower wall portion 12 and the cover 13, thereby surrounding the opening 15 formed on the lower wall portion 12. The sealing sponge 14 is provided so as to seal an entire perimeter of the opening 15 between the cover 13 and the lower wall portion 12.

The cover 13 is provided with a cushioning material 16 thereon. The cushioning material 16 prevents noises and so forth generated by interference of the cover 13 and the upper wall portion 11, or by interference of the cover 13 and the hinge member 5 (in particular, the arm 53).

Between the spoiler device 10 and the roof 2, a gap (a required clearance) is provided to allow the spoiler device 10 to pivot relative to the roof 2. In FIG. 2, a trajectory of the pivotal movement of the spoiler device 10 is drawn with double-dotted lines. From a viewpoint of appearance at the rear edge of the roof 2, the smaller required clearance is better. In order to reduce the required clearance, the common hinge shaft 52 of the hinge member 5 needs to be provided as close as possible to the design surface of the spoiler (the upper wall portion 11). In particular, the thickness of the spoiler device 10 needs to be reduced as much as possible at the portion located above the common hinge shaft 52. With a structure described above, the spoiler device 10 controls air stream of the automobile 1 by controlling air pressure applied thereto.

According to the embodiment, the thickness of the spoiler device 10 is set to be extremely small at the portion located above the common hinge shaft 52. Nevertheless, adhesion of the upper wall portion 11 and the lower wall portion 12 is prevented because the opening 15 is made on the lower portion 12 after the lower wall portion 12 is blow formed, and thus a gap is provided between the upper wall portion 11 and the lower wall portion 12. Therefore, according to the spoiler device 10 of the embodiment, even though the common hinge shaft 52 is positioned closer to the upper wall portion 11 (the design surface of the spoiler), no sink marks occur on the design surface and thus elimination of the sink marks is not necessary after a blow forming process. Consequently, the spoiler device 10 having a good cosmetic appearance is provided with no additional cost for surface finishing and so forth. In addition, the spoiler device 10 includes the cover 13 for covering the opening 15, and the cover 13 may be made of other materials than the material of the spoiler, such as the iron plate having small thickness and high strength. In addition, a rear end (the rear edge) of the opening 15 or the inside of the spoiler is not visible externally since the opening 15 of the lower wall portion 12 is covered by the cover 13, which further improves the appearance of the spoiler device 10. In addition, the cover 13 covering the opening 15 prevents water and so forth from ingressing inside the spoiler from the opening 15, thereby ensuring a waterproof performance. In addition, the cover 13 covering the opening 15 reinforces strength of a portion around the opening 15, thereby preventing probable reduction in the strength thereof that derives from providing the opening 15.

In addition, according to the spoiler device 10 of the embodiment, the cover 13 is in the recessed shape in the direction of the upper wall portion 11. Consequently, the common hinge shaft 52 of the hinge member 5 is provided closer to the upper wall portion 11 (the design surface of the spoiler), thereby contributing to reducing the required clearance between the roof 2 and the spoiler device 10.

In addition, according to the spoiler device 10 of the embodiment, the sealing sponge 14 is provided to surround the opening 15 for sealing between the cover 13 and the lower wall portion 12. Consequently, waterproofing is ensured and the waterproof performance is improved.

According to the spoiler device 10 of the embodiment, the lower wall portion 12 is formed integrally with the upper wall portion 11 by blow forming and provided between the upper wall portion 11 and the common hinge shaft 52. The lower wall portion 12 includes the opening 15 at the portion located above the common hinge shaft 52. The opening 15 of the lower wall portion 12 is covered by the cover 13.

According to the spoiler device 10 of the embodiment, the cover 13 is in the recessed shape in the direction of the upper wall portion 11.

According to the embodiment, the spoiler device 10 includes the seal member 14 provided between the cover 13 and the lower wall portion 12 so as to surround the opening 15 for sealing between the cover 13 and the lower wall portion 12.

According to the spoiler device 10 of the embodiment, the cover 13 is adapted to be fixedly attached to the arm 53 of the hinge member 5.

According to the spoiler device 10 of the embodiment, the back door 3 includes the back door main body 6 pivotally supported by the hinge member 5 relative to the roof 2 and the glass 4 pivotally supported by the hinge member 5 relative to the roof 2, the glass 4 being fixedly attached to the arm 53 of the hinge member 5.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A spoiler device for a vehicle for controlling air stream of the vehicle, the spoiler device covering a hinge member and pivoting in response to a pivotal movement of a back door supported by the hinge member in a pivotally movable manner in a vertical direction thereof, the spoiler device comprising:

an upper wall portion adapted to be arranged adjacent to a roof of the vehicle and extending along the roof in a width direction of the vehicle;

a lower wall portion formed integrally with the upper wall portion by blow forming and provided between the upper wall portion and a hinge shaft provided at the hinge member, the lower wall portion including an opening at a portion located above the hinge shaft; and a cover fixedly attached to the lower wall portion for covering the opening.

2. The spoiler device according to claim 1, wherein the cover is in a recessed shape in a direction of the upper wall portion.

3. The spoiler device according to claim 1, further comprising a seal member provided between the cover and the lower wall portion so as to surround the opening for sealing between the cover and the lower wall portion.

4. The spoiler device according to claim 1, wherein the cover is adapted to be fixedly attached to an arm of the hinge member.

5. The spoiler device according to claim 4, wherein the back door includes a back door main body pivotally supported by the hinge member relative to the roof and a glass pivotally supported by the hinge member relative to the roof, the glass being fixedly attached to the arm of the hinge member.

* * * * *